(12) United States Patent
Andreis-Olinger et al.

(10) Patent No.: US 6,638,465 B1
(45) Date of Patent: Oct. 28, 2003

(54) PROCESS OF MANUFACTURING EVOH/POLYESTER BISTRETCHED FILM AND THE FILM THUS OBTAINED

(75) Inventors: Christine Andreis-Olinger, Merzkirchen (DE); Gusty Feyder, Luxembourg (LU)

(73) Assignee: Dupont Teijin Films US Limited Partnership, Wilmington, DE (US)

( * ) Notice: Subject to any disclaimer, the term of this patent is extended or adjusted under 35 U.S.C. 154(b) by 0 days.

(21) Appl. No.: 09/701,819

(22) PCT Filed: May 28, 1999

(86) PCT No.: PCT/EP99/03758

§ 371 (c)(1),
(2), (4) Date: Jun. 11, 2001

(87) PCT Pub. No.: WO99/62694

PCT Pub. Date: Dec. 9, 1999

(30) Foreign Application Priority Data

Jun. 3, 1998 (EP) .............................................. 98401321

(51) Int. Cl.$^7$ ................................................ B29C 47/06
(52) U.S. Cl. ................................ 264/173.15; 264/290.2
(58) Field of Search ....................... 264/173.12, 173.15, 264/290.2

(56) References Cited

U.S. PATENT DOCUMENTS

| | | | | | |
|---|---|---|---|---|---|
| 3,871,947 | A | * | 3/1975 | Brekken | 428/142 |
| 4,828,915 | A | * | 5/1989 | Schroeder et al. | 428/332 |
| 4,880,706 | A | * | 11/1989 | Mazuera et al. | 428/516 |
| 5,061,534 | A | * | 10/1991 | Blemberg et al. | 428/36.7 |
| 6,451,967 | B1 | * | 9/2002 | Ninomiya et al. | 528/503 |

* cited by examiner

Primary Examiner—Mark Eashoo

(57) ABSTRACT

A multilayer film is formed by coextruding and bistretching EVOH, binder and polyester followed by heat treating for less than 8 seconds at a temperature between 170° C. and 250° C.

13 Claims, No Drawings

PROCESS OF MANUFACTURING EVOH/POLYESTER BISTRETCHED FILM AND THE FILM THUS OBTAINED

FIELD OF THE INVENTION

The invention relates to a process of manufacturing a EVOH/Polyester (coextruded) bistretched film. The invention also relates to such a film, showing high barrier properties and high mechanical properties.

BACKGROUND OF THE INVENTION

Extrusion of multilayer films is well-known. Stretching of films, being monolayer or multilayer films, is known as well.

The above techniques have been applied to many different types of films, in order to obtain the desired results. One multilayer film that would be of high interest is a film containing a layer of EVOH and a layer of polyester. The layer of EVOH would impart barrier properties such as gas barrier properties against oxygen, carbon dioxide, helium, aroma and flavors, etc. . . . The layer of polyester would impart mechanical properties, such as Young's modulus, tensile strength, heat resistance, clarity, etc. . . . Since these two types of polymers are not compatible, a coextrusion binder is necessary. Thus, one would look for films having one layer of EVOH, one layer of coextrusion binder and one layer of polyester.

The process of manufacturing such films is, however, very delicate. Especially, stretched films are very difficult to manufacture, since the layer of EVOH is very difficult to stretch, especially to bistretch. As a matter of fact, polyester, being nearly amorphous at the exit of the extruder, can be easily stretched, either simultaneously or sequentially, and high quality film is easily obtained. The EVOH layer on the contrary, has a high tendency to crystalise under heat and stress, so that a sequential stretching is not possible: stretching in MD direction forms a crystalline EVOH layer, that breaks whilst the attempt to stretch in TD direction. Simultaneous stretching is thus required. Eventually, the stretched films are heat set, so as to develop the mechanical properties of the film, thanks to the polyester layer.

Thus, there is a need for a method that would allow the production of valuable multilayer EVOH/PET films, but would also be cost effective and easy to carry out.

JP-A-55139263 discloses a process where a multilayer film is bistretched then heat treated at a temperature below the melting point of the EVOH material. This, however, is not satisfactory, since the melting point of all EVOH grades suitable for high barrier applications is below 190° C., preferably below 180° C., most preferably below 170° C. Such low heat-set temperatures are not appropriate to maintain the thermo-mechanical strength of the outer polyester layers, resulting from the biaxial stretching. This would lead to a high thermal shrinkage and the high mechanical strength of polyester film would be lost at higher temperatures.

JP-A-63272548 discloses a process for manufacturing a laminate stretched film comprising coextruding a 5-layer film, especially polyester/binder/EVOH/binder/polyester, simultaneously bistretching it, and heat-treating it under the following conditions:

$0.5 \leq X \leq 5$

EVOH melting point+40° C. $\leq T \leq$ polyester melting point 8 sec $\leq t \leq$ 25 sec where:

X=total polyester thickness/EVOH thickness
T=heat treatment temperature
t=heat treatment time Examples given in this document provide simultaneous bistretching at a temperature of 90° C., at ratios of 3.3×3.3, followed by heat treatment at a temperature of about 230° C., for a duration of about 15 sec. The respective polymers are PET, EVOH and modified PET or modified EVA resin as a binder. The thicknesses (unstretched/stretched) of the EVOH and PET layers are respectively about 54 µm/5 µm and about 130 µm/12 µm, giving a X value of about 2.5. The EVOH melting point is about 180 (leading to on heatset temperature of 220° C. for EVOH mp+40° C.) while PET melting point is about 260° C. At this high heatset temperatures, the film starts to crystallize and gets brittle very fast. Heatset times higher than 8 seconds will definitely lead to film breakage in the oven and a loss of mechanical properties, especially elongation, due to high crystallization and brittleness thereof. Additionally, running a film line with such high hold-up times in the heatset zones would require either very long heatset zones in the oven or very low line speeds. This is economically not suitable for such a product.

SUMMARY OF THE INVENTION

The object of the present invention is a process where the heat treatment is carried out during a time below 8 sec., and at a temperature preferably below 220° C.

The resulting film shows enhanced properties, especially when the ratio of thicknesses of polyester to EVOH is higher than 5.

DETAILED DESCRIPTION OF THE INVENTION

The polyester used in the invention is any polyester where the major part of it is comprised of any aromatic repeating ester units. The term polyester in this invention refers to a polymer that is obtained by condensation polymerization of an aromatic dicarboxylic acid such as terephthalic acid or 2,6-naphthalene dicarboxylic acid and of an aliphatic glycol such as ethylene glycol, 1,4-butanediol or 1,4-cyclohexane dimethanol. These polymers, in addition to being homopolymers, may also be copolymers having a third component or several components. In this case, the dicarboxylic acid component may be, for example, isophthalic acid, phthalic acid, terephthalic acid, 2,6-naphthalene dicarboxylic acid, 4,4'-diphenyldicarboxylic acid, adipic acid, sebacic acid, decanedicarboxylic acid and 1,4-cyclohexane dicarboyxlic acid; the oxycarboxylic acid component can be, for example, p-oxybenzoic acid and the glycol component can be, for example, ethylene glycol, diethylene glycol, triethylene glycol, propylene glycol, butanediol, neopentyl glycol, 1,4-cyclohexane dimethanol, polyethylene glycol and polytetramethylene glycol.

Examples of such polyesters are polyethylenenaphthalate (PEN), polybutyleneterephthalate (PBT), polyethyleneterephthalate (PET), the latter PET being the preferred polyester.

Mixtures are also possible, optionally with another polymer different from a polyester. The intrinsic viscosity of the polyester that is used in the invention may vary from e.g. 0.45 to e.g. 0.7, measured in phenoltetrachloreethane at 30° C. The MW may vary within broad limits, e.g. between 10000 to 30000 g/mol.

The binder material is any material that is adhesive and allow the polyester and EVOH layers to show adhesion, with either adhesive rupture or cohesive rupture. The skilled man will choose the binder thanks to its general knowledge or thanks to routine tests.

Examples of such binders include modified polyolefins, polyacrylates, polyurethanes, polyesters, etc.

Examples of binders are the following (co)polymers, grafted with maleic anhydride or glycidyl methacrylate, in which the grafting rate is for example from 0.01 to 5% by weight:

PE, PP, copolymers of ethylene with propylene, butene, hexene, octene, butadiene, EPR, EPDM, containing, for example, 35 to 80% by weight ethylene, as well as any styrene-based block copolymers such as SBS, SIS, SEBS, and the like;

ethylene and vinyl acetate (EVA) copolymers containing up to 40% by weight vinyl acetate;

ethylene and alkyl (meth)acrylate copolymers containing up to 40% by weight alkyl(meth)acrylate;

ethylene and vinyl acetate (EVA) and alkyl (meth)acrylate copolymers, containing up to 40% by weight comonomers.

Further examples of binders are the following (co) polymers, in which ethylene represents preferably at least 60% by weight and where the termonomer represents, for example, 0.1 to 10% by weight of the copolymer:

ethylene/alkyl (meth)acrylate or methacrylic acid/maleic anhydride or glycidyl methacrylate copolymers;

ethylene/vinyl acetate/maleic anhydride or iglycidyl methacrylate copolymers;

ethylene/vinyl acetate/alkyl (meth)acrylate or methacrylic acid/maleic anhydride or glydicyl methacrylate copolymers. The term "alkyl (meth)acrylate" stands for C1 to C6 alkyl, such as methyl, ethyl, butyl and 2-ethylhexyl methacrylates and acrylates. Moreover, these polyolefins can also be cross-linked using any suitable process or agent (di-epoxy diacid, peroxy, etc.)

Still further examples of binders include grafted copolymers constituted by at least one monoamino oligomer of polyamide and of an alpha-mono-olefin (co)polymer grafted with a monomer able to react with the amino functions of said oligomer;

Mixtures thereof are also envisaged. The molecular weight of these binders can also vary greatly, as those skilled in the art will understand.

Examples of such binder compositions are provided in the following patents, this list not being exclusive:

FR-A-2,291,225, FR-A-2,132,780, EP-A-0,210,307, EP-A-0,033,220, EP-A-0,266,994, EP-A-0,171,777, EP-A-0,342,066, EP-A-0,218,665, U.S. Pat. No. -4,758,477, U.S. Pat. No. -4,762,890, U.S. Pat. No. -4,966,810, U.S. Pat. No. -4,452,942, U.S. Pat. No. -3,658,948, U.S. Pat. No. -5,217, 812, all of which being incorporated herein by reference.

A prefered binder is an anhydride-modified ethylene vinyl acetate copolymer.

The term "EVOH" as used in the instant invention aims at designing ethylene/vinyl alcohol copolymers containing for example from 15 to 80, preferably 20 to 50 mol % of ethylene. A preferred EVOH contains more than 30 mol %, especially more than 40 mol % of ethylene. This kind of copolymer is well-known in the art, and can be obtained, for example, by saponification of an ethylene/vinyl acetate copolymer, with a saponification degree of generally more than 90%, most preferably more than 95%. A third monomer can be present, in an amount not adversely hindering the barrier porperties. It is permissible to blend other components keeping within a range of not adversely hindering the barrier properties. The blending component should preferably be not more than 40 weight %, more preferably not more than 30 weight %, most particularly not more than 20 weight %.

Such blending resins, for example, include the above ethylene-vinyl alcohol copolymers having an ethylene content different from those which are used as main components, or ethylene-vinyl alcohol copolymers having an ethylene content greater than those which are used as main components, or their partially saponified products, polyamide type polymers, polyester type polymers, ethylene-vinyl ester copolymers, ethylene-aliphatic unsaturated aliphatic acid copolymers, ethylene-aliphatic unsaturated aliphatic acid ester copolymers, ionomer resins, styrene-conjugated diene block copolymers, a partially hydrogenated product of said block copolymer, or else these polymers which have been modified, for example, by grafting a monomer having a carboxylic acid group as a polar functional group, copolymers of ethylene and carbon monoxide, or additionally with the vinyl acetate component or a resin wherein at least some of the acetate groups have been converted into hydroxyl groups, and ethylene, propylene resins, and the like, other that those mentioned above; at least one from these should be used.

Various additives, such as UV-agents, stabilizers, sliding agents, antioxidants, fillers, etc. can be added to each component of the layer, in classical amounts.

The coextrusion referred to in the instant invention is any classical extrusion. The extrusion may be of the type T-die, with feeding block, of the blow film type, etc. Also encompassed in the invention is the extrusion, where individual films are produced, which are then laminated on each other so as to build up a raw multilayer film. In fact, any method that produces a raw film is appropriate; preferably this method is coextrusion.

The extrusion temperature of the EVOH may optimized to reach high barrier properties; said temperature may generally be lower than 220° C., preferably between about 180 and 210° C.

The biaxial stretching or bistretching is carried out simultaneously. It includes stretch ratios of 2 to 5, especially 2.5 to 4, in each direction. The ratio MD stretch ratio/TD stretch ratio is generally comprised between 0.5 to 2, especially 0.7 to 1.3. The suitable stretching temperature is comprised between 75 and 130° C., generally about 90° C. The raw film to e stretched can be preheated, if necessary. Preheat temperature can be as high as the stretching temperature; for example preheat can be performed at a temperature of 80° C. (for about 10 sec) while stretching is carried out at a temperature of 90° C. Any simultaneous stretching apparatus can be used; preferably polyester stretching apparatuses are used. Examples of simultaneous bistretching apparatus are disclosed in the following US patents, all incorporated herein by reference: U.S. Pat. Nos. 4,675,582; 4,825,111; 4,853,602; 4,922,142; 5,036,262; 5,051,225; 5,072,493 and 5,416,959.

The heat treatment (or heatsetting) referred to in the instant invention is the classical heat treatment carried out for polyesters; classical apparatuses are used like introducing hot air or using infrared lamps, etc. Either "heatset" or "heat treatment" is used in the instant invention, without any distinction.

The raw film shows a total thickness generally between about 10 and 1000 μm, especially between about 50 and 500

µm. The thickness of the polyester layer (total) is generally between about 20 and 950 µm, preferably between 50 and 300 µ. The thickness of the EVOH layer is generally between about 5 and 100 µm, preferably between 10 and 70 µm. The thickness of the binder layer (total) is generally between about 3 and 30 µm, preferably below 10 µm. The ratio thickness of polyester (total) to thickness of EVOH can vary within broad limits; generally, this ratio is above 1, preferably above 5. The resulting bistretched film shows a thickness generally between about 5 and 200 µm, especially between about 10 and 100 µm. Each layer, polyester, EVOH, binder is present according to relative thicknesses as given above with respect to the raw film. For example, the EVOH layer may have a thickness between 1 and 10 µm.

The instant film formed of the various layers can be of various structures and the polyester used can vary from one layer to another. For example, one layer can be obtained from starting products containing scrap material, allowing recycling. Content of scrap is variable within broad limits known to the skilled man. Also, the polyester can have a different nature from one layer to another, or they can be the same. All polyester layers can be comprised of crystalline polyester, or all layer can be comprised of amorphous copolyester, or one layer can be crystalline and the other(s) can be amorphous. For example, the invention provides 5-layer films where one layer is crystalline (i.e. PET) while the other layer is amorphous (i.e. copolyester) This allows to combine specific mechanical properties of crystalline polyester and adhesive properties of the copolyester. It can also be forseen that each layer may be formed of two or more sub-layers; e.g. the outer polyester layer can be formed of one sub-layer of PET and one sub-layer of copolyester, the first one being in contact with the binder layer. The instant films can be used as individual layers in further multilayer films.

The following examples further illustrate the present invention, but do not limit the scope thereof.

EXAMPLES

EVOH:

EVOH polymer was delivered by Kuraray Eval Europe GmbH Duesseldorf.

Grade E105U, 44 mol % ethylene content, density 1.14 g/cm$^3$, melt flow index 5.5 g/10 min., melt point 165° C.

BINDER (Bynel)

The binder is an anhydride-modified ethylene vinyl acetate copolymer.

Density 0.95 g/cm$^3$, melt index 10.9 g/lomin, melt point 165° C.

PET:

IV: 0.56 dl/g, melt point 256° C.

The polyester polymer was extruded at a temperature of 280° C., the binder polymer at 240° C. The EVOH barrier polymer was extruded at different temperatures (230° C., 205° C. and 175° C.). Die temperature was at 290° C.

The cast film samples are summarised in table 1. The thickness of the different layers was confirmed via microtome-cuts under the microscope.

TABLE 1

Cast film samples

| Sample | PET µm | Bynel µm | EVOH µm | Bynel µm | PET µm | EVOH Extr. Temp. ° C. |
|---|---|---|---|---|---|---|
| A | 50 | <10 | 50 | <10 | 50 | 230 |
| B | 55 | <10 | 40 | <10 | 55 | 230 |
| C | 60 | <10 | 30 | <10 | 60 | 230 |
| D | 65 | <10 | 20 | <10 | 65 | 230 |
| E | 70 | <10 | 10 | <10 | 70 | 230 |
| F | 70 | <10 | 10 | <10 | 70 | 205 |
| G | 70 | <10 | 10 | <10 | 70 | 175 |

The cast films were cut into pieces of 11.2 cm×11.2 cm, preheated at 80–90° C. for 10 sec and simultaneously stretched at 90° C. at a stretch ratio of 3.3×3.3 in 2.2 sec.

The stretched samples were chucked into a frame for preheating at 170° C., 200° C. and 230° C. for 3, 8, 15 and 20 seconds. The resulting stretched films are summarised in table 2.

TABLE 2

Simultaneously stretched films

| Roll No. | Preheat Temp. [° C.] | Strech Temp. [° C.] | Stretch Ratio | Heatset Temp. [° C.] | Heatset Time [sec] |
|---|---|---|---|---|---|
| 1 | 80 | 90 | 3.3 × 3.3 | 230 | 20 |
| 2 | 80 | 90 | 3.3 × 3.3 | 230 | 20 |
| 3 | 80 | 90 | 3.3 × 3.3 | 230 | 15 |
| 4 | 80 | 90 | 3.3 × 3.3 | 230 | 15 |
| 5 | 80 | 90 | 3.3 × 3.3 | 230 | 8 |
| 6 | 80 | 90 | 3.3 × 3.3 | 230 | e |
| 7 | 80 | 90 | 3.3 × 3.3 | 230 | 3 |
| 8 | 80 | 90 | 3.3 × 3.3 | 230 | 3 |
| 9 | 80 | 90 | 3.3 × 3.3 | 200 | 20 |
| 10 | 80 | 90 | 3.3 × 3.3 | 200 | 20 |
| 11 | 80 | 90 | 3.3 × 3.3 | 200 | 15 |
| 12 | 80 | 90 | 3.3 × 3.3 | 200 | 15 |
| 13 | 80 | 90 | 3.3 × 3.3 | 200 | 8 |
| 14 | 80 | 90 | 3.3 × 3.3 | 200 | 8 |
| 15 | 80 | 90 | 3.3 × 3.3 | 200 | 3 |
| 16 | 80 | 90 | 3.3 × 3.3 | 200 | 3 |
| 17 | 80 | 90 | 3.3 × 3.3 | 170 | 20 |
| 18 | 80 | 90 | 3.3 × 3.3 | 170 | 20 |
| 19 | 80 | 90 | 3.3 × 3.3 | 170 | 15 |
| 20 | 80 | 90 | 3.3 × 3.3 | 170 | 15 |
| 21 | 80 | 90 | 3.3 × 3.3 | 170 | 8 |
| 22 | 80 | 90 | 3.3 × 3.3 | 170 | 8 |
| 23 | 80 | 90 | 3.3 × 3.3 | 170 | 3 |
| 24 | 80 | 90 | 3.3 × 3.3 | 170 | 3 |

This is stretch and heatset pattern was applied for film samples D, E, F and G.

To evaluate the influence of the thickness of the EVOH layer on the oxygen barrier, samples A–G were stretched under the same conditions (see above) and heatset at 200° C. for 8 sec.

The oxygen barrier was determined with an Ox-tran twin tester. The following table 2 provides the results.

TABLE 3

Oxygen barrier of the film samples

| Sample | Film Thickness [μm] | EVOH Thickness [μm] | EVOH Extrusion Temp. | Oxygen Barrier cc/m²/d |
|---|---|---|---|---|
| A | 15 | 5 | 230° C. | 5.1 |
| B | 14 | 4 | 230° C. | 7.5 |
| C | 15 | 3 | 230° C. | 10.2 |
| D | 14 | 2 | 230° C. | 13.3 |
| E | 14 | 1 | 230° C. | 21.6 |
| F | 13 | 1 | 205° C. | 6.6 |
| G | 13 | 1 | 175° C. | 7.3 |

As expected, the oxygen permeability in increasing from 5 to 21 cc/m²/d with the decreasing thickness of the EVOH barrier layer from 5 to 1 μm. But also the extrusion temperature of the EVOH polymer has a strong influence on the oxygen barrier. By decreasing the extrusion temperature from 230° C. 205° C. the oxygen permeability drops from 21 to 6.6 cc/m²/d. According to these results, a 5 μm EVOH layer extruded at 230° C. to offers the same oxygen barrier than a 1 μm EVOH layer extruded at 205° C.

Samples D–G were examined more intensively regarding the influence of heatset time and temperature. The results of the oxygen barrier are summarised in table 4.

TABLE 4

Oxygen barrier (expressed in cc/m²/d) for samples D–G at different heatset conditions (see table 2)

| Roll N° | Sample D | Sample E | Sample F | Sample G |
|---|---|---|---|---|
| 1 | 15.1 | 25.7 | 6.2 | 9.3 |
| 3 | 17.5 | 26.3 | 5.3 | 9.2 |
| 5 | 14.1 | 27.4 | 6.6 | 7.8 |
| 7 | 16.6 | 28.0 | nd | 8.9 |
| 9 | 16.2 | 25.6 | 5.9 | 9.5 |
| 11 | 17.0 | 26.8 | 5.7 | 10.0 |
| 13 | 14.5 | 27.4 | 5.7 | 8.2 |
| 15 | 15.0 | 24.5 | 5.5 | 8.9 |
| 17 | 18.1 | 25.7 | 6.3 | 8.5 |
| 19 | 20.5 | 28.4 | 5.9 | 7.2 |
| 21 | 16.5 | 21.6 | 5.7 | 7.2 |
| 23 | 14.5 | 23.2 | 7.3 | 8.5 | nd: not determined

Like in table 3, the oxygen permeability is increasing with decreasing EVOH layer thickness and decreasing with lower EVOH extrusion temperature.

However, it can be said that there is no dependence of the oxygen barrier on heatset time and temperature. High oxygen barrier properties may however be obtained with a lower EVOH extrusion temperature, such as about 205° C.

Mechanical properties, i.e. modulus, tensile strength, force at 3% elongation (F3), force at 5% elongation (F5) and elongation at break, along the MD (machine direction) and the TD (transverse direction) were determined with an Instron equipment at room temperature.

For samples A–G, the mechanical properties at heatset conditions of 200° C. and during 8 sec, are listed on the following table 5.

For samples D–G, the mechanical properties at all heatset conditions (see table 3), are listed on the following pages on table 6–9.

TABLE 5

Mechanical properties of samples A–G

| Sample | Modulus [N/mm²] MD | Modulus [N/mm²] TD | F3 [N/mm²] MD | F3 [N/mm²] TD | F5 [N/mm²] MD | F5 [N/mm²] TD | Tensile [N/mm²] MD | Tensile [N/mm²] TD | Elongation [%] MD | Elongation [%] TD |
|---|---|---|---|---|---|---|---|---|---|---|
| A (15 μm) | 3610 | 3563 | 83 | 81 | 97 | 95 | 174 | 166 | 111 | 116 |
| B (14 μm) | 3768 | 3770 | 87 | 86 | 101 | 100 | 182 | 181 | 105 | 117 |
| C (15 μm) | 3934 | 3783 | 90 | 86 | 105 | 102 | 204 | 203 | 110 | 130 |
| D (14 μm) | 3862 | 3731 | 90 | 86 | 105 | 103 | 205 | 190 | 113 | 122 |
| E (15 μm) | 4032 | 3809 | 92 | 89 | 109 | 105 | 201 | 209 | 97 | 131 |
| F (13 μm) | 3690 | 3620 | 84 | 83 | 96 | 95 | 162 | 150 | 112 | 96 |
| G (13 μm) | 3741 | 3726 | 85 | 85 | 98 | 99 | 170 | 154 | 94 | 84 |

TABLE 6

Mechanical Property Data Sample D (Thickness = 14 μm)

| Roll N° | Modulus MD [N/mm²] | Modulus TD [N/mm²] | F3 MD [N/mm²] | F3 TD [N/mm²] | F5 MD [N/mm²] | F5 TD [N/mm²] | Tensile MD [N/mm²] | Tensile TD [N/mm²] | Elongation MD [%] | Elongation TD [%] |
|---|---|---|---|---|---|---|---|---|---|---|
| 1 | 3981 | 4140 | 87 | 87 | 93 | 93 | 172 | 173 | 127 | 116 |
| 3 | 4005 | 4064 | 87 | 88 | 95 | 97 | 181 | 184 | 117 | 114 |
| 5 | 4099 | 4229 | 87 | 87 | 95 | 94 | 183 | 177 | 109 | 114 |

TABLE 6-continued

Mechanical Property Data Sample D (Thickness = 14 μm)

| Roll N° | Modulus MD [N/mm²] | Modulus TD [N/mm²] | F3 MD [N/mm²] | F3 TD [N/mm²] | F5 MD [N/mm²] | F5 TD [N/mm²] | Tensile MD [N/mm²] | Tensile TD [N/mm²] | Elongation MD [%] | Elongation TD [%] |
|---|---|---|---|---|---|---|---|---|---|---|
| 7  | 4099 | 4363 | 86 | 92 | 95  | 101 | 181 | 194 | 106 | 106 |
| 9  | 3896 | 4025 | 86 | 88 | 97  | 97  | 190 | 188 | 106 | 122 |
| 11 | 3935 | 3986 | 85 | 85 | 93  | 93  | 179 | 172 | 110 | 109 |
| 13 | 4116 | 4276 | 88 | 89 | 96  | 97  | 200 | 173 | 121 | 101 |
| 15 | 4120 | 4208 | 89 | 89 | 98  | 98  | 195 | 192 | 111 | 114 |
| 17 | 4158 | 3849 | 89 | 85 | 100 | 95  | 200 | 201 | 110 | 126 |
| 19 | 4145 | 4156 | 89 | 88 | 100 | 99  | 203 | 203 | 114 | 118 |
| 21 | 4051 | 4074 | 88 | 89 | 98  | 99  | 219 | 208 | 126 | 114 |
| 23 | 3967 | 4251 | 87 | 93 | 96  | 103 | 212 | 227 | 121 | 118 |

TABLE 7

Mechanical Property Data Sample E (Thickness = 14 μm)

| Roll N° | Modulus MD [N/mm²] | Modulus TD [N/mm²] | F3 MD [N/mm²] | F3 TD [N/mm²] | F5 MD [N/mm²] | F5 TD [N/mm²] | Tensile MD [N/mm²] | Tensile TD [N/mm²] | Elongation MD [%] | Elongation TD [%] |
|---|---|---|---|---|---|---|---|---|---|---|
| 1  | 4541 | 4770 | 92 | 91 | 99  | 103 | 179 | 193 | 106 | 104 |
| 3  | 4316 | 4497 | 92 | 94 | 102 | 103 | 201 | 207 | 118 | 110 |
| 5  | 4655 | 4712 | 97 | 96 | 104 | 104 | 200 | 209 | 107 | 112 |
| 7  | 4488 | 4508 | 94 | 94 | 102 | 102 | 183 | 198 | 86  | 107 |
| 9  | 4528 | 4420 | 95 | 94 | 104 | 103 | 207 | 208 | 113 | 116 |
| 11 | 4307 | 4393 | 91 | 92 | 100 | 103 | 198 | 208 | 106 | 121 |
| 13 | 4421 | 4344 | 92 | 91 | 101 | 99  | 202 | 192 | 121 | 116 |
| 15 | 4173 | 4521 | 89 | 94 | 98  | 104 | 205 | 209 | 129 | 111 |
| 17 | 4316 | 4357 | 94 | 94 | 105 | 107 | 212 | 229 | 116 | 116 |
| 19 | 4186 | 4269 | 91 | 92 | 101 | 103 | 206 | 196 | 116 | 116 |
| 21 | 4136 | 4023 | 87 | 89 | 97  | 100 | 197 | 213 | 102 | 120 |
| 23 | 4171 | 4082 | 92 | 90 | 102 | 100 | 207 | 203 | 115 | 119 |

TABLE 8

Mechanical Property Data Sample E (Thickness = 13 μm)

| Roll N° | Modulus MD [N/mm²] | Modulus TD [N/mm²] | F3 MD [N/mm²] | F3 TD [N/mm²] | F5 MD [N/mm²] | F5 TD [N/mm²] | Tensile MD [N/mm²] | Tensile TD [N/mm²] | Elongation MD [%] | Elongation TD [%] |
|---|---|---|---|---|---|---|---|---|---|---|
| 1  | 3416 | 3688 | 73 | 77 | 78 | 82 | 139 | 155 | 113 | 118 |
| 3  | 3742 | 3388 | 78 | 73 | 82 | 76 | 143 | 133 | 109 | 124 |
| 5  | 3603 | 3334 | 75 | 73 | 78 | 77 | 143 | 123 | 109 | 116 |
| 7  | 3211 | 3516 | 71 | 75 | 75 | 79 | 118 | 130 | 98  | 76  |
| 9  | 3247 | 3580 | 71 | 77 | 77 | 83 | 142 | 145 | 103 | 106 |
| 11 | 3577 | 3476 | 77 | 74 | 83 | 80 | 148 | 135 | 99  | 88  |
| 13 | 3199 | 3608 | 71 | 77 | 76 | 83 | 140 | 147 | 118 | 91  |
| 15 | 3216 | 3590 | 71 | 77 | 76 | 84 | 140 | 141 | 111 | 82  |
| 17 | 3799 | 3729 | 78 | 84 | 78 | 86 | 193 | 190 | 113 | 107 |
| 19 | 3745 | 3619 | 79 | 82 | 85 | 82 | 183 | 183 | 107 | 117 |
| 21 | 3655 | 3609 | 77 | 76 | 83 | 82 | 188 | 178 | 107 | 95  |
| 23 | 3436 | 3294 | 75 | 72 | 82 | 77 | 151 | 144 | 102 | 125 |

TABLE 9

Mechanical Property Data Sample E (Thickness = 13 μm)

| Roll N° | Modulus MD [N/mm²] | Modulus TD [N/mm²] | F3 MD [N/mm²] | F3 TD [N/mm²] | F5 MD [N/mm²] | F5 TD [N/mm²] | Tensile MD [N/mm²] | Tensile TD [N/mm²] | Elongation MD [%] | Elongation TD [%] |
|---|---|---|---|---|---|---|---|---|---|---|
| 1  | 3818 | 3971 | 82 | 85 | 89 | 92 | 163 | 173 | 123 | 119 |
| 3  | 3996 | 3868 | 84 | 83 | 91 | 89 | 165 | 159 | 113 | 107 |
| 5  | 3891 | 3853 | 82 | 82 | 88 | 88 | 163 | 157 | 109 | 105 |
| 7  | 3710 | 4008 | 81 | 84 | 87 | 82 | 159 | 162 | 115 | 87  |
| 9  | 3614 | 3926 | 80 | 84 | 87 | 93 | 154 | 168 | 105 | 93  |
| 11 | 3577 | 3845 | 80 | 84 | 88 | 92 | 154 | 167 | 106 | 107 |
| 13 | 3653 | 3748 | 80 | 82 | 88 | 89 | 162 | 155 | 118 | 105 |

TABLE 9-continued

Mechanical Property Data Sample E (Thickness = 13 μm)

| Roll N° | Modulus MD [N/mm²] | Modulus TD [N/mm²] | F3 MD [N/mm²] | F3 TD [N/mm²] | F5 MD [N/mm²] | F5 TD [N/mm²] | Tensile MD [N/mm²] | Tensile TD [N/mm²] | Elongation MD [%] | Elongation TD [%] |
|---|---|---|---|---|---|---|---|---|---|---|
| 15 | 3674 | 3803 | 80 | 82 | 88 | 89 | 151 | 161 | 99 | 97 |
| 17 | 3898 | 3831 | 83 | 81 | 91 | 89 | 205 | 186 | 120 | 100 |
| 19 | 3560 | 3530 | 79 | 78 | 87 | 85 | 155 | 157 | 107 | 120 |
| 21 | 3677 | 3677 | 79 | 79 | 86 | 86 | 187 | 194 | 122 | 133 |
| 23 | 3425 | 3536 | 76 | 79 | 82 | 85 | 153 | 153 | 115 | 103 |

From the above results, it can be concluded, that a heatset time between 3 and 8 seconds is best suited to obtain a stabilised polyester barrier film with useful mechanical properties and a high oxygen barrier.

It can also be concluded that the invention allows processing of EVOH copolymer with high ethylene content while still obtaining very good barried (oxygen barrier) properties; this is surprising since it is generally admitted that high ethylene content and high barrier property are antinomic.

The invention was described with reference to a preferred embodiment. However, many variations are possible within the scope of the invention.

What is claimed is:

1. A process for manufacturing a multilayer film, comprising at least a layer of EVOH, a layer of a coextrusion binder, and a layer of polyester, comprising the steps of:
   (i) coextruding a layer of EVOH, a layer of a coextrusion binder and layer of polyester;
   (ii) simultaneously bistretching the layers of (i); and
   (iii) heat treating the layers of (ii) at a temperature between 170° C. and 250° C. and during a heat treatment time below 8 sec.

2. The process according to claim 1, where the heat treatment time is comprised between 3 and below 8 sec.

3. The process according to claim 1 where the heat treatment temperature is below 220° C.

4. The process according to claim 1 where the heat treatment temperature is between 180 and 210° C.

5. The process according to claim 1 where a ratio thickness of polyester to thickness of EVOH is above 5.

6. The process according to claim 1 where the EVOH extrusion temperature is below 220° C.

7. The process according to claim 1 where the simultaneously bistretching is performed at a temperature between 75 and 130° C.

8. The process according to claim 1 where the simultaneously bistretching is performed at stretching ratios of from 2 to 5 in each direction.

9. The process according to claim 1 with preheating before the bistretching step (ii).

10. The process according to claim 1 where the multilayer film is a 5-layer film polyester/binder/EVOH/binder/polyester.

11. The process according to claim 1 where the EVOH contains more than 30 mol % of ethylene.

12. The process according to claim 1 where the polyester is PET.

13. The process according to claim 1 where the binder is an anhydride-modified ethylene vinyl acetate copolymer.

* * * * *